United States Patent
Slutsky (10) Patent No.: US 11,354,784 B2
(45) Date of Patent: Jun. 7, 2022

(54) SYSTEMS AND METHODS FOR TRAINING A NON-BLIND IMAGE DEBLURRING MODULE

(71) Applicant: GM GLOBAL TECHNOLOGY OPERATIONS LLC, Detroit, MI (US)

(72) Inventor: Michael Slutsky, Kfar Saba (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 334 days.

(21) Appl. No.: 16/806,135

(22) Filed: Mar. 2, 2020

(65) Prior Publication Data

US 2021/0272248 A1  Sep. 2, 2021

(51) Int. Cl.
*G06T 5/00* (2006.01)
*G06N 3/08* (2006.01)
*B60R 1/00* (2022.01)
*G06K 9/62* (2022.01)

(52) U.S. Cl.
CPC ............... *G06T 5/003* (2013.01); *B60R 1/00* (2013.01); *G06K 9/6256* (2013.01); *G06N 3/084* (2013.01); *B60R 2300/30* (2013.01)

(58) Field of Classification Search
CPC ........ G06T 5/003; B60R 1/00; G06K 9/6256; G06N 3/084
See application file for complete search history.

(56) References Cited

U.S. PATENT DOCUMENTS

| | | | |
|---|---|---|---|
| 10,360,664 B2 | 7/2019 | Lee et al. | |
| 10,853,916 B2* | 12/2020 | Tang | ..................... G06T 3/4053 |
| 11,257,191 B2* | 2/2022 | Litwiller | ................. G06T 5/003 |
| 2019/0304113 A1* | 10/2019 | Huang | ...................... G06T 1/20 |
| 2020/0394752 A1* | 12/2020 | Liu | ......................... G06N 5/046 |
| 2021/0183020 A1* | 6/2021 | Gollanapalli | ............ G06T 7/73 |
| 2021/0272248 A1* | 9/2021 | Slutsky | ............... G06N 3/0454 |
| 2021/0287345 A1* | 9/2021 | Li | ........................... G06T 5/003 |

* cited by examiner

*Primary Examiner* — Gregory M Desire
(74) *Attorney, Agent, or Firm* — Lorenz & Kopf LLP (57) ABSTRACT

Methods and systems for training a non-blind deblurring module are disclosed. Unblurred test images and blurred test images are received, wherein each of the blurred test images is related to a corresponding one of the unblurred test images by a blur kernel term and a noise term. A regularized deconvolution sub-module and a convolutional neural network are jointly trained by adjusting a regularization parameter of a regularized deconvolution function and weights of a convolution neural network in order to minimize a cost function representative of a difference between each deblurred output image and a corresponding one of the unblurred test images.

20 Claims, 6 Drawing Sheets

SYSTEMS AND METHODS FOR TRAINING A NON-BLIND IMAGE DEBLURRING MODULE

TECHNICAL FIELD

The present disclosure generally relates to non-blind image deblurring, and more particularly relates to methods and systems for training a non-blind image deblurring module.

An image captured by a camera may be blurred for a variety of reasons. For example, the camera may have been moving or shaking during image capture. Image blur may also be caused by optical aberrations. Chromatic blur is also prevalent by which different wavelengths are refracted to different extents. Non-blind deconvolution techniques are known by which a blurred input image is processed in order to obtain a clearer, deblurred, output image. According to such deconvolution techniques, a blur kernel is utilized to transform the blurred input image to a deblurred output image. The blur kernel may be determined from a point spread function representing the nature of anticipated blurring effects. In the case of a camera mounted to a moving vehicle, the point spread function is derived based on knowledge of the vehicle motion and the deblurring kernel is determined based on the point spread function. That is, a blur source is often well known in imaging and the blurring process can be modeled quite well using a point spread function (PSF) that is directly measured or derived from knowledge of the physics of blurring.

Most blurred images include noise as well as blurring. The noise further complicates the deblurring problem. Classical techniques usually remove the blur but add other artifacts. Brute-force direct application of Deep Neural Nets may be successful but only for relatively weak blur. Further, since the deconvolution method is largely changed according to influences of the noise and changes of the blur kernel, methods using deep learning techniques have been limited in accuracy and calculation speed.

Image deblurring can often be reduced to deconvolution using the blur kernel. Deconvolution is an ill-posed inverse problem. As such, it should be regularized. Regularization parameters add stability to the solution. However, optimizing the regularization parameters is a challenging task. If there is too much stability, a blurry output may result, whilst too little stability may result in noise amplification.

Accordingly, it is desirable to provide systems and methods that provide non-blind image deblurring that operate efficiently through the use of regularized deconvolution techniques, whereby a regularization parameter has been efficiently and optimally selected to improve deblurred image outputs. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method of training a non-blind deblurring module is provided. The non-blind deblurring module includes a regularized deconvolution sub-module and a convolutional neural network sub-module. The regularized deconvolution sub-module is configured to perform a regularized deconvolution function on a blurred input image to produce a deconvolved image potentially having image artifacts. The convolutional neural network sub-module is configured to receive the deconvolved image as an input to a convolutional neural network and to remove image artifacts, thereby providing a deblurred output image. The method includes receiving, via at least one processor, unblurred test images and blurred test images. Each of the blurred test images is related to a corresponding one of the unblurred test images by a blur kernel term and a noise term. The method includes jointly training, via the at least one processor, the regularized deconvolution sub-module and the convolutional neural network. Joint training includes adjusting a regularization parameter of the regularized deconvolution function and weights of the convolution neural network in order to minimize a cost function representative of a difference between each deblurred output image and a corresponding one of the unblurred test images, thereby providing a trained regularization parameter, trained weights and a trained non-blind deblurring module. The method further includes receiving, via the at least one processor, a blurred input image from an imaging device, deblurring, via the at least one processor, the blurred input image using the trained non-blind deblurring module, and outputting, via at least one processor, a deblurred output image.

In embodiments, the deconvolution function is a Wiener deconvolution function. In embodiments, the deconvolution function is a Tikhonov-regularized deconvolution function.

In embodiments, the method includes using the trained non-blind deblurring module to deblur the blurred input image, thereby producing the deblurred output image. The regularized deconvolution sub-module performs the regularized deconvolution function on the blurred input image to produce a deconvolved image potentially having image artifacts, the regularized deconvolution function including the trained regularization parameter, and the convolutional neural network sub-module processes the deconvolved image through the convolutional neural network to remove image artifacts, the convolution neural network including the trained weights.

In embodiments, the convolutional neural network outputs residuals and the trained non-blind deblurring module adds the residuals to the deconvolved image, thereby producing the deblurred output image.

In embodiments, the method includes adjusting, via the at least one processor, the regularization parameter and the weights using a back propagation algorithm. In embodiments, the back propagation algorithm adjusts the regularization parameter based on gradients that have been fed back from the CNN and a derivative of the deconvolved image potentially having image artifacts with respect to the regularization parameter.

In embodiments, the at least one processor receives the unblurred test images and artificially generates the blurred test images using a blur kernel function and a noise function on the unblurred test images.

In embodiments, the blurred input image is received from the imaging device mounted to a vehicle.

In embodiments, the vehicle includes a vehicle controller. The method includes the vehicle controller controlling at least one vehicle function based on the deblurred output image.

In accordance with another exemplary embodiment, a system for training a non-blind deblurring module is provided. The system includes a non-blind deblurring module including a regularized deconvolution sub-module and a convolutional neural network sub-module. The regularized deconvolution sub-module is configured to perform a regularized deconvolution function on a blurred input image to produce a deconvolved image potentially having image artifacts. The convolutional neural network sub-module is configured to receive the deconvolved image as an input to a convolutional neural network and to remove image artifacts, thereby providing a deblurred output image. The system includes at least one processor configured to execute program instructions. The program instructions are configured to cause the at least one processor to receive unblurred test images and blurred test images. Each of the blurred test images is related to a corresponding one of the unblurred test images by a blur kernel term and a noise term. The program instructions are configured to cause the at least one processor to jointly train the regularized deconvolution sub-module and the convolutional neural network by adjusting a regularization parameter of the regularized deconvolution function and weights of the convolution neural network in order to minimize a cost function. The cost function is representative of a difference between each deblurred output image and a corresponding one of the unblurred test images, thereby providing a trained regularization parameter, trained weights and a trained non-blind deblurring module. The program instructions further causing the at least one processor to: receive a blurred input image from the imaging device, deblur the blurred input image using the trained non-blind deblurring module, and output a deblurred output image.

In embodiments, the deconvolution function is a Wiener deconvolution function. In embodiments, the deconvolution function is a Tikhonov-regularized deconvolution function.

In embodiments, the trained non-blind deblurring module is configured to deblur the blurred input image, thereby producing the deblurred output image. The regularized deconvolution sub-module is configured to perform the regularized deconvolution function on the blurred input image to produce a deconvolved image potentially having image artifacts using the trained regularization parameter. The convolutional neural network sub-module is configured to process the deconvolved image through the convolutional neural network to remove image artifacts using the trained weights.

In embodiments, the convolutional neural network is configured to output residuals and the trained non-blind deblurring module is configured to add the residuals to the deconvolved image, thereby producing the deblurred output image.

The program instructions are configured to cause the at least one processor to adjust the regularization parameter and the weights using a back propagation algorithm. In embodiments, the program instructions are configured to cause the at least one processor to adjust the regularization parameter based on gradients that have been fed back from the CNN and a derivative of the deconvolved image potentially having image artifacts with respect to the regularization parameter.

In embodiments, the program instructions are configured to cause the at least one processor to receive the unblurred test images and artificially generate the blurred test images using a blur kernel function and a noise function on the unblurred test images.

In embodiments, the system includes a vehicle. The vehicle includes a camera and the non-blind deblurring module. The non-blind deblurring module is configured to receive the blurred input image from the camera.

In embodiments, the vehicle includes a control module configured to control at least one vehicle function based on the deblurred output image.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Described herein are systems and methods for non-blind image deblurring based on a hybrid system using a classical regularized deconvolution module and a Convolutional Neural Network (CNN). Parameters of the regularization module are determined together with CNN weights by a joint training procedure. Training data includes any relevant image database and system-generated blur and noise images. The systems and methods disclosed herein have been found to produce artifact free image deblurring even for almost arbitrarily strong blur in the input images. The system and methods disclosed herein are relevant for multiple sensing scenarios—high exposure-time motion blur, chromatic blur, etc.

Figure 1:
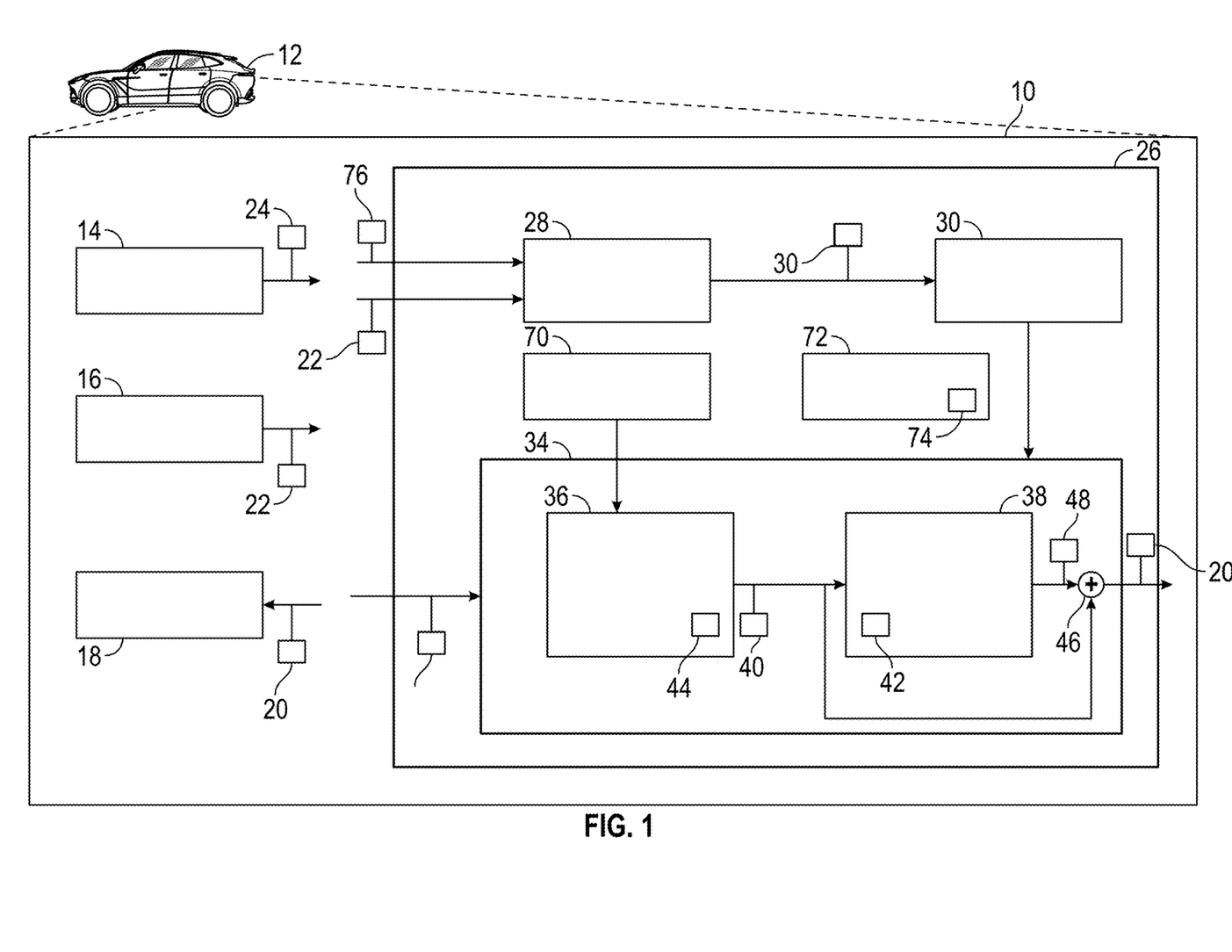
FIG. 1 is a functional block diagram of a system for non-blind deblurring, in accordance with an exemplary embodiment.

FIG. 1 illustrates a system 10 for non-blind image deblurring. The system 10 includes a vehicle 12, an imaging device 14 mounted to the vehicle 12, vehicle sensors 16, a vehicle controller, a vehicle controller 18 and a usage processing system 26. Usage processing system 26 includes a non-blind deblurring module 34 executed by a processor 70 and computer program instructions 74 stored on memory 72. In embodiments, imaging device 14 is configured to capture images as blurred input images 24, which are deblurred using a regularized deconvolution function 44 and a convolutional neural network, CNN 42 included in non-blind deblurring module to thereby produce deblurred output images 20. The deblurred output images are used by vehicle controller 18 to control one or more functions of the vehicle 12.

The system 10 is shown in the context of (e.g. included within) the vehicle 12, specifically an automobile. The system 10, however, is useful in other vehicular contexts such as aircraft, sea vessels, etc. The system 10 is applicable outside of vehicular contexts including any electronic device, such as a mobile telephone, a camera, and a tablet device, that captures an image subject to blurring. The present disclosure is particularly, but not exclusively, relevant to blurring as a result of motion (which will often occur in vehicular contexts particularly at night or other times when exposure times are extended). The system 10 is useful with respect to other blurring sources than motion such as those caused by optical aberrations or chromatic filtering.

In various embodiments, the vehicle 12 is an autonomous vehicle and the system 10 is incorporated into the autonomous vehicle 12. However, the system 10 is useful in any kind of vehicle (autonomous or otherwise) that includes the imaging device 14 that produces images subject to blurring. The autonomous vehicle 12 is, for example, a vehicle that is automatically controlled to carry passengers from one location to another. The vehicle 12 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 12 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

In embodiments, the vehicle 12 includes the vehicle controller 18 configured to control one or more vehicular functions based on images from the imaging device 14. The vehicle controller 18 may include one or more advanced driver-assistance systems configured to provide electronic driver assistance based on images from the imaging device 14. The vehicle controller 18 may include an autonomous driver or semi-autonomous driver configured to control the vehicle 12 through one or more actuation systems (e.g. propulsion, braking and steering systems) based on images input from the imaging device 14. In all such embodiments, better deblurred input images will allow the vehicle controller 18 to more safely control the vehicle 12.

In accordance with various embodiments, system 10 includes the imaging device 14 (e.g. a front, rear or side mounted camera), vehicle sensors 16, the vehicle controller 18 and the usage processing system 26. The usage processing system 26 is configured, by programming instructions 74 executing on a processor 70 (as described further below), to receive a blurred input image 24 from the imaging device 14 and to perform the regularized deconvolution function 44 on the blurred input image that relies upon a regularization parameter. The resulting deconvolved image 40 is passed through the convolutional neural network (CNN) 42 in order to remove any image artifacts that have arisen from the deconvolution function 44. According to the present disclosure, weights of the CNN 42 and the regularization parameter of the deconvolution function 44 are jointly trained. That is, the regularization parameter is part of a back propagation chain when training the CNN 42. The jointly trained network layers include layers of CNN 42 and a deconvolution layer.

Continuing to refer to FIG. 1, the usage processing system 26 includes the at least one processor 70, the memory 72, and the like. The processor 70 may execute the program instructions 74 stored in the memory 72. The processor 70 may refer to a central processing unit (CPU), a graphics processing unit (GPU), or a dedicated processor on which the methods and functions according to the present disclosure are performed. The memory 72 may be composed of a volatile storage medium and/or a non-volatile storage medium. For example, the memory 72 may be comprised of a read only memory (ROM) and/or a random access memory (RAM). The memory 72 stores at least one instruction executed by the processor 70 in order to implement blocks, modules and method steps described herein. Although modules 28, 30 and 34 are shown separately from the processor 70, the memory 72 and the programming instructions 74, this is purely for visualization. In reality, the modules 28, 30 and 34 are embodied by programming instructions 74 stored on the memory 72 and executable by one or more processors 70 of the usage processing system 26.

The imaging device 14 is any suitable camera or video device that produces images. Images are presumed to include blurring (and thus are labelled blurred input images 24) for the purposes of the present disclosure as a result of motion blurring or other types of blur sources. The imaging device 14 may be a color imaging device or a grayscale imaging device. The imaging device 14 may operate in visible and/or infrared spectrums. The imaging device 14 may produce one, two or three-dimensional (1D, 2D or 3D) images serving as the blurred input images 24.

The vehicle sensors 16 include a variety of sensors used by vehicle controller 18 in order to control operation of the vehicle 12. Of particular relevance to the present disclosure are speed (e.g. wheel speed sensors), acceleration (accelerometers and gyroscopes) and other vehicle sensors 16 that provide data 22 representing sensed parameters of vehicle motion. Motion parameters data 22 is used by the usage processing system 26 in order to determine a point spread function (PSF), as described further herein. The point spread function as determined by the usage processing system is used in deconvolution function 44 to deblur the blurred input image 24. Although the present disclosure is described, in the most part, in terms of a PSF that is dynamically determined based on motion parameters data 22, the disclosed systems and methods are applicable in other applications whenever the blurring model is known. Sometimes blurring is inherent in the imaging device 14 itself and the imaging device can be calibrated to measure the PSF directly without reference to external sensed data. The present disclosure finds use in those applications as well.

Blurring of an input image can be represented mathematically by the following equation:

$$I_B = I \times K_B \quad \text{(equation 1)}$$

where $I_B$ is a blurred input image 24, I is an unknown, unblurred image corresponding to the blurred input image 24 and $K_B$ is a matrix or blur kernel that models a point spread function (PSF) describing the nature of the blurring in the blurred input image 24. Since the present disclosure is concerned with non-blind deblurring, it is assumed that the PSF is known and thus the blur kernel $K_B$ can be derived from the PSF. PSFs for all manner of blurring are known in the art including blurring caused by motion of imaging device 14 during exposure. In theory, the inverse of the blur kernel or matrix (the inverse being represented by Kg') can be multiplied with the blurred input image 24 to resolve the unblurred image I. However, noise in the blurred input image 24 makes such a straightforward deconvolution impractical. The noise component will be amplified during the deconvolution process in an uncontrolled way, likely leading to deconvolved images that are less clear (or more blurred) than the original blurred input image 24. One solution to this noise amplification problem is to use a regularized inverse of the blur kernel to deblur the blurred input image 24.

Such regularized deconvolution functions are known in the art and two examples will be provided in the following. Regularized deconvolution functions rely on a regularization parameter λ to mitigate the effects of noise. The regularization parameter λ has a large impact on quality of deblurring. If the regularization parameter λ is too low, then noise can have a significant impact on the output image. If the regularization parameter λ is too high, then blur is magnified in the output image. According to the present disclosure, the regularization parameter λ is determined as part of a joint training process for CNN weights of CNN 42.

Referring to FIG. 1, the regularization deconvolution sub-module 36 receives blurred input image 24 and operates the regularized deconvolution function 44 thereon. The regularized deconvolution function 44 includes an inverse regularized blur kernel or matrix that is determined as a function of trained regularization parameter 2. Usage processing system 26 includes a point spread function module 28, which receives motion parameters data 22 including, at least speed and optionally acceleration data, to determine point spread function (PSF) data 30 representing a PSF function. Psf data 31 is variable depending upon vehicle motion (e.g. the faster the vehicle, the greater the spread or blur defined by the PSF) and camera data 76 representing relevant camera parameters obtained from imaging device 14 (e.g. exposure time). Psf data 31 is determined by point spread function module 28, which includes a modelling function for determining anticipated PSF based on motion parameters data 22 and camera data 76. Blur kernel determination module 30 transforms the PSF defined in Psf data 31 into matrix form and outputs corresponding blur kernel data 32. In cases where motion induced blur is not the source of blur, then determining the PSF in this way is not necessary.

Regularized deconvolution sub-module 36 receives blur kernel data 32 representing blur kernel $K_B$ and makes use thereof in carrying out a regularized deconvolution on blurred input image 24 in order to generate deconvolved image 40. It should be appreciated that many varieties of PSFs and the determination thereof are available depending upon the nature of the source of blur. Although the present disclosure is largely described in terms of motion blur and in association with vehicle applications, other blur sources, and thus other ways of determining the PSF, can be incorporated in the present disclosure depending on the application. Thus, point spread function module 28 is not necessarily dependent on motion parameters data 22 or camera data 76 (specifically exposure time). For example, when imaging over a broad range of wavelengths (e.g. more than one color), the combined image will often be blurred because each of a plurality of wavelength bands refract to a different extent by optics of the imaging device 14. A point spread function can be defined to reverse such chromatic blurring.

Figure 2:
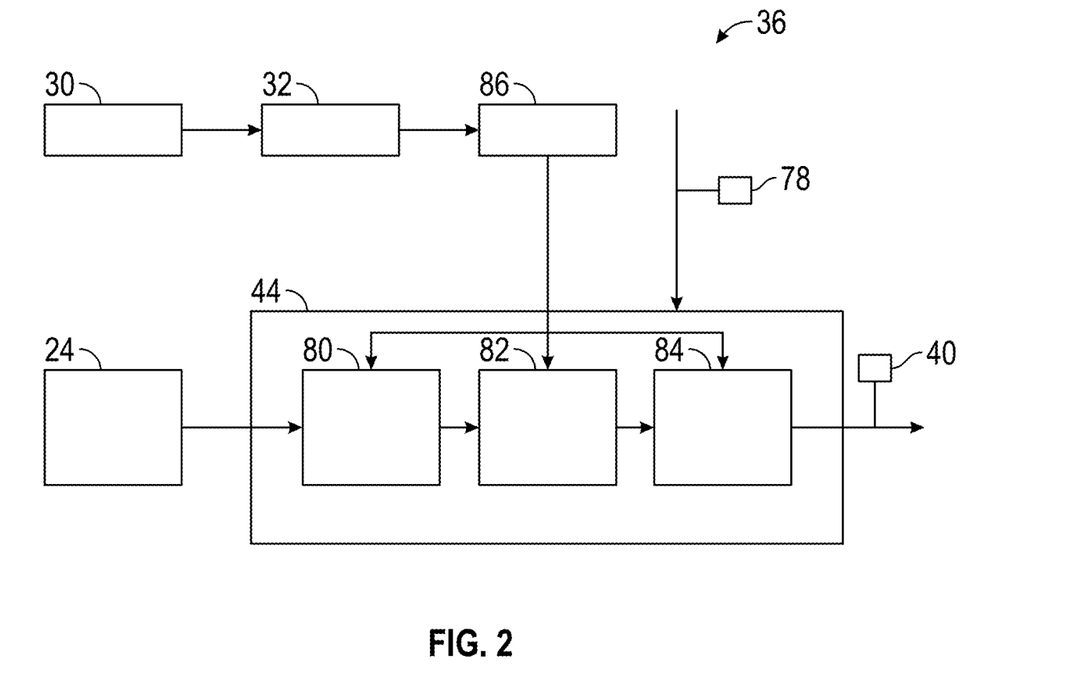
FIG. 2 is a functional block diagram of data processes in a regularized deconvolution sub-module, in accordance with an exemplary embodiment.

FIG. 2 illustrates an exemplary data flow diagram for a regularized deconvolution function 44 used by the regularized deconvolution sub-module 36 in the case of 1D motion blur. The regularized deconvolution function 44 is, in this case, a Tikhonov regularized deconvolution function. Following FIG. 2, the PSF module 28 generates Psf data 31 representing PSF, which is transformed into the blur kernel $K_B$ defined by the blur kernel data 32. The blur kernel is subject to a singular-value decomposition (SVD) in order to generate USV decomposition matrices according to equation 2:

$$K_B = USV^T \quad \text{(equation 2)}$$

The inverse of the regularized blur kernel is found to be:

$$[K_B]_{REG}^{-1} = VS(S^2 + \lambda^2 I)^{-1} U^T \quad \text{(equation 3)}$$

where I (unblurred version of blurred input image 24) is:

$$I \approx I_B [K_B]_{REG}^{-1} \quad \text{(equation 4)}$$

and $I_B$ is the blurred input image 24.

Continuing to refer to FIG. 2, the regularized deconvolution function 44 is made up by inverse decomposed matrices 80, 82, 84 as a result of an SVD and inversion operation on the blur kernel $K_B$. The matrix 82 is a function of the trained regularization parameter λ 78 and is of the form $S(S^2 + \lambda^2 I)^{-1}$. The blurred input image 24 is multiplied by decomposition matrices 80, 82, 84 as part of the regularized Tikhonov deconvolution function 44 to thereby provide a deconvolved image 40.

Figure 3:
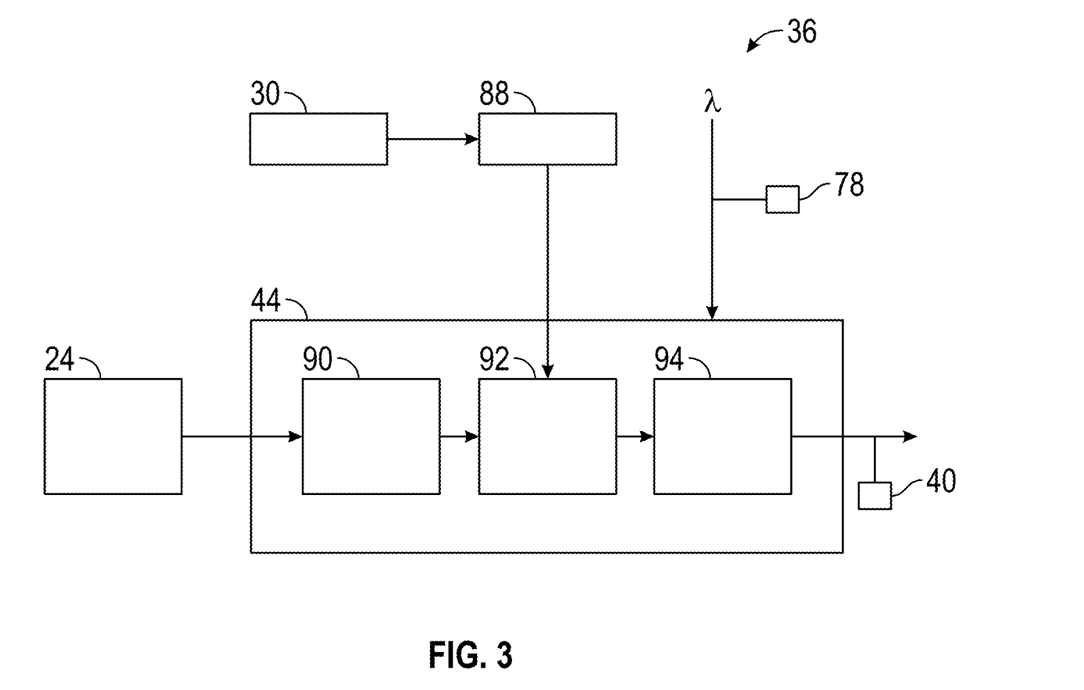
FIG. 3 is a functional block diagram of data processes in another regularized deconvolution sub-module, in accordance with an exemplary embodiment.

FIG. 3 illustrates an exemplary data flow diagram for a regularized deconvolution function 44 used by the regularized deconvolution sub-module 36 in the case of 2D motion blur. The regularized deconvolution function 44 is, in this case, a Wiener regularized deconvolution function. The Wiener regularized deconvolution function is defined by the following equations:

$$\tilde{I}_B(\vec{k}) = \tilde{I}(\vec{k})\tilde{K}_B(\vec{k}),\qquad \text{(equation 6)}$$

$$\tilde{I}(\vec{k}) = FFT(I), \text{ and} \qquad \text{(equation 7)}$$

$$\tilde{I}(\vec{k}) = \tilde{I}_B(\vec{k})\frac{\tilde{K}_B^+(\vec{k})}{\left|\tilde{K}_B(\vec{k})\right|^2 + \lambda^2} = \tilde{I}_B(\vec{k})\tilde{K}_B^{-1}(\vec{k},\lambda) \qquad \text{(equation 8)}$$

Following FIG. 3, the PSF module 28 generates Psf data 31 representing PSF, which is transformed into the blur kernel $K_B$ defined by blur kernel data 32. The blur kernel $K_B$ is subject to a first Fast Fourier Transform (FFT) operation 88 as required by equation 7. Similarly, the blurred input image 24 is subject to a second FFT operation 90 and then operated upon by an inverse of the regularized blur kernel at operation 92, which is represented by $\tilde{K}_B^{-1}(\vec{k}, \lambda)$ and is a function of the trained regularization parameter λ 78. The Wiener regularized deconvolution function further includes an inverse FFT operation 94 for the output of the operation 92. In this way, the deconvolved image 40 is output by the regularized deconvolution sub-module 36.

The deconvolved image 40 will, generally, have artifacts as an inherent result of the regularized deconvolution process. For that reason, the non-blind deblurring module 34 includes the CNN sub-module 38 having the CNN 42 configured, through training, to remove any image artifacts in the deconvolved image 40. In one embodiment, the CNN 42 is a residual U-net. The CNN 42 is trained to remove artifacts and, at the same time, the regularized deconvolution sub-module 36 is trained to determine an optimal regularization parameter 2.

Figure 4:
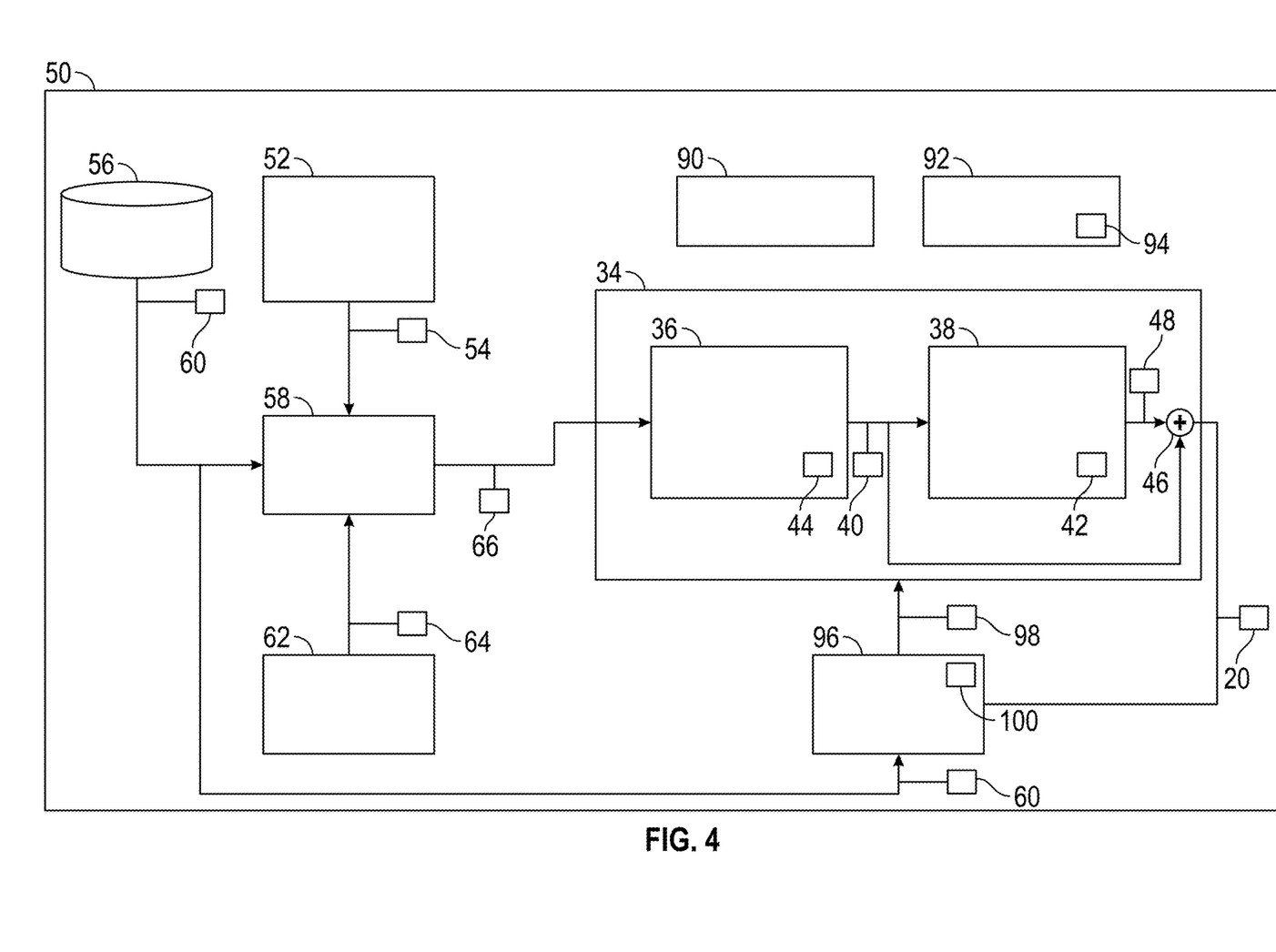
FIG. 4 is a functional block diagram of a system for training a non-blind deblurring module, in accordance with an exemplary embodiment.

FIG. 4 provides a functional block diagram of a training processing system 50 for training the non-blind deblurring module 34, in accordance with an exemplary embodiment. Training processing system 50 includes an image database 56 serving as a source of unblurred test images 60. A point spread function generation module 52 generates artificial PSFs embodied in artificial PSF data 54. Artificial PSFs are generated so as to be similar to PSFs that would occur during usage of the non-blind deblurring module 34. For example, in the case of vehicular applications, randomized PSFs are generated representing 1D or 2D deblurring based on exposure times and motion parameters that would be encountered during operation of the vehicle 12. A noise generation module 62 provides artificial noise data 64 representative of noise to be applied to the unblurred test image 60. A gaussian function may be utilized by the noise generation module 62. The blurred image generation module 58 receives unblurred the test image 60, the artificial PSF data 54 and the artificial noise data 64 and generates a blurred test image 66 that corresponds to the unblurred test image 60 but includes blurring based on the artificial PSF data 54 and noise based on the artificial noise data 64.

The training processing system 50 includes a processor 91 and memory 93 storing programming instructions 95. The processor 91 executes the programming instructions 95 in order to instigate a training process, as will be described, and the various modules of the training processing system 50. During the training process, the regularized deconvolution sub-module 36 is configured to receive the blurred test image 66 and to deconvolve (as described elsewhere herein) the blurred test image 66 into a sharp, but potentially artifact ridden, deconvolved image 40. Exemplary artifacts include unpleasant ringing artifacts that appear near strong edges. The CNN sub-module 38 is configured to receive the deconvolved image and to generate output residuals 48 after passing the deconvolved image through layers of the CNN 42. The residuals 48 are representative of image artifacts after the CNN 42 has been trained. The residuals 48 and the deconvolved image 40 are combined at summing function 46 in order to produce a deblurred output image 20. The training process, executed by training processing system 50, adjusts weights of the CNN 42 and the regularization parameter λ in order to make the deblurred output image 20 match as closely as possible to the unblurred test image 60. That is, a cost function module 96 implements a cost function 100 to generate cost data 98 representative of a difference between the deblurred output image 20 and the unblurred test image 60.

The training processing system 50 jointly adjusts weights of the CNN 42 and the regularization parameter λ of the regularized deconvolution sub-module 36 in a repeating process in order to minimize the cost data 98. In embodiments, the training processing system 50 utilizes a back propagation algorithm. The back propagation algorithm computes the gradient of the cost function 100 with respect to the weights of the CNN 42 and the gradient of the cost function 100 with respect to the regularization parameter λ for the unblurred test image 60 and the deblurred output image 20. Such gradient methods jointly train layers of the CNN 42 and a regularized deconvolution layer and update weights and the regularization parameter λ to minimize the cost function 100 (e.g. to minimize cost value defined by the cost data 98). The backpropagation algorithm computes the gradient of the cost function 100 with respect to each weight and the regularization parameter λ by the chain rule, computing the gradient one layer at a time, iterating backward from the last layer of the CNN 42 (closest to the output) to the first layer of the CNN 42 and ending with the regularized deconvolution layer.

Figure 5:
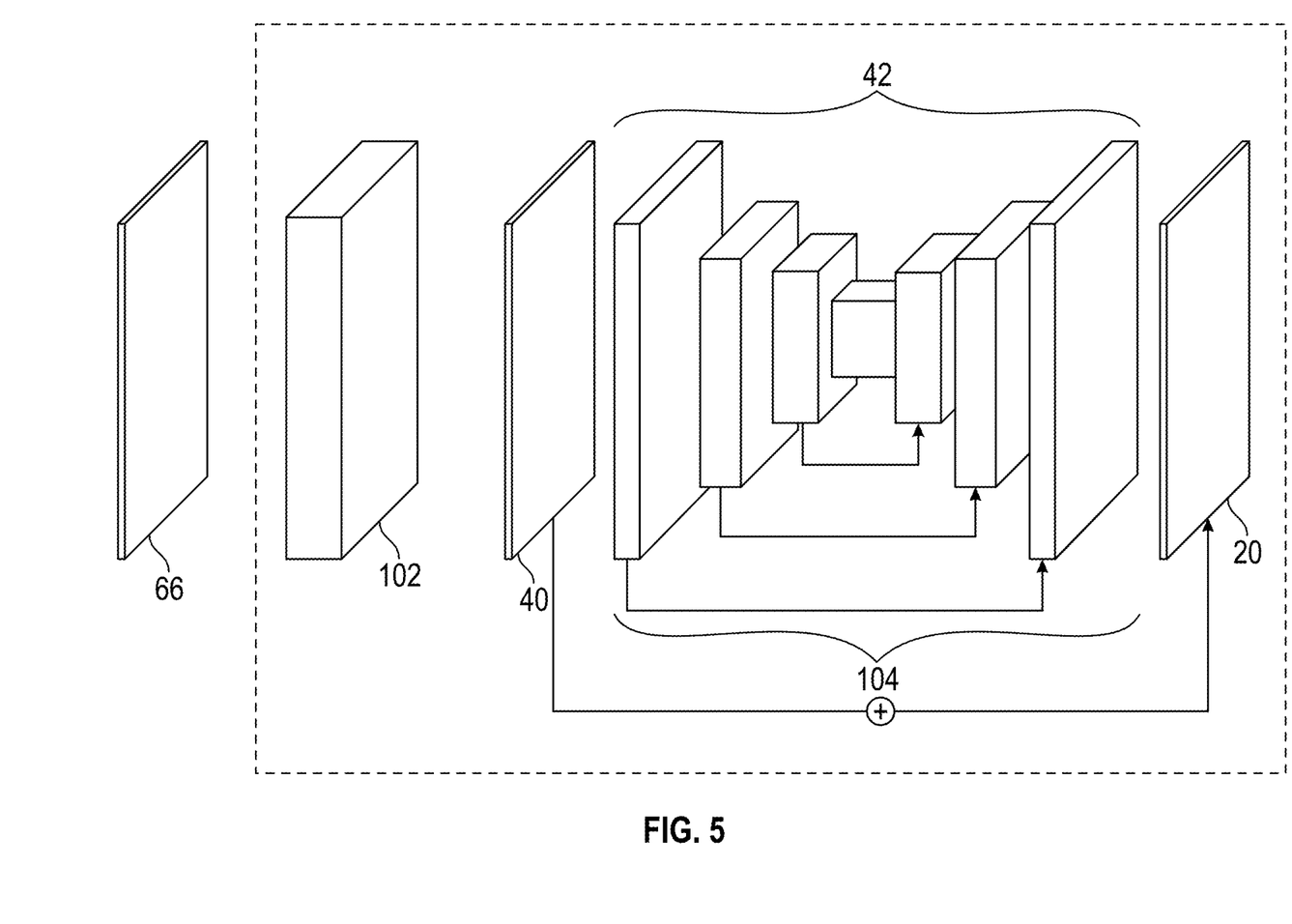
FIG. 5 is a functional block diagram representing data transformation processed in a non-blind deblurring module, in accordance with an exemplary embodiment.

A layer-based conception of the training of the non-blind deblurring module 34 is shown in FIG. 5. The blurred test image 66 is passed through a regularized deconvolution layer 102 to produce a deconvolved image 40 that is subsequently passed through layers of the CNN 42 to produce residuals 48 that are added to the deconvolved image 40 to provide the deblurred output image 20. According to the present disclosure, the CNN layers 104 and the regularized deconvolution layer 102 are trained by adjusting weights of the CNN layers 104 and the regularization parameter λ of the regularized deconvolution layer 102 during the same back propagation process.

Within a standard gradient-based cost function optimization scheme (such as SGD optimization), the update relation for any neural network (NN) parameter θ (from step n−1 to step n) is:

$$\theta_n = \theta_{n-1} - \eta\frac{\partial L}{\partial \theta} \qquad \text{(equation 9)}$$

Where L is the cost function of the neural network and η is the learning rate. Typically, since the dependence of the cost function on any neural network parameter θ is manifested through a chain-like dependence scheme, the required gradients are calculated by a backpropagation algorithm.

Specifically, if $$L = g_0(g_1(g_2(\ldots(g_N(\theta))))) \qquad \text{(equation 10)}$$

then $$\frac{\partial L}{\partial \theta} = \frac{\partial L}{\partial g_N} \frac{\partial g_N}{\partial \theta} \qquad \text{(equation 11)}$$

As regards the present disclosure, the overall cost, calculated by cost function module 96, as a function of regularization parameter λ is:

$$L = L(J_{DB}(\lambda)) \qquad \text{(equation 12)}$$

That is, the cost function 100 is a function of deconvolved image $J_{DB}$ 40, which itself is a function of the regularization parameter λ. In order to determine the derivative of the cost L with respect to regularization parameter λ as required by equation 9, there is:

$$\frac{\partial L}{\partial \lambda} = \frac{\partial L}{\partial J_{DB}} \frac{\partial J_{DB}}{\partial \lambda} \qquad \text{(equation 13)}$$

$$\frac{\partial L}{\partial J_{DB}}$$

represents back propagation from CNN 42 and represents the accumulation of layer by layer derivatives as a result of back propagation calculations through the CNN layers 104. The input gradients $$\frac{\partial L}{\partial J_{DB}}$$

are fed back from the CNN 42 and represent the change in the cost function 100 with respect to the change in the deconvolved image $J_{DB}$. This term is multiplied by $$\frac{\partial J_{DB}}{\partial \lambda},$$

which represents a change in the deconvolved image $J_{DB}$ 40 with respect to change in the regularization parameter λ.

In the case of Tikhonov regularized deconvolution, $$\frac{\partial L}{\partial \lambda} = \frac{\partial L}{\partial J_{DB}} \frac{\partial J_{DB}}{\partial \lambda} = -\left(\frac{\partial L}{\partial J_{DB}}\right) J_B U \frac{2S\lambda}{(S^2 + \lambda^2 I)^2} V^T, \qquad \text{(equation 14)}$$

which can be derived from equation 3. The update scheme for the regularization parameter will be:

$$\lambda_n = \lambda_{n-1} + \eta \left(\frac{\partial L}{\partial J_{DB}}\right) J_B U \frac{2S\lambda}{(S^2 + \lambda^2 I)^2} V^T, \qquad \text{(equation 15)}$$

which can be derived from a combination of equations 9 and 14.

In the case of regularized Wiener deconvolution, $$\lambda_n = \lambda_{n-1} + \eta \left(\frac{\partial L}{\partial J_{DB}}\right) IFFT\left[J_B(k) \frac{2\lambda K^*(k)}{(|K(k)|^2 + \lambda^2)^2}\right]. \qquad \text{(equation 16)}$$

For both of equations 15 and 16, gradients obtained through back propagation through the CNN 42 allow calculation of $$\frac{\partial L}{\partial J_{DB}},$$

which is multiplied by change in the deconvolved image 40 with respect to change in the regularization parameter, thereby providing a value for the regularization parameter for the current step or iteration of the training processing system 50. Training processing system 50 repeats such steps in order to minimize the cost function 100 with respect to both CNN weights and the regularization parameter. Training processing system 26 outputs the non-blind deblurring module 34 having trained CNN weights 106 loaded in the CNN 42 and a trained regularization parameter 78 loaded in the deconvolution function 44.

Figure 6:
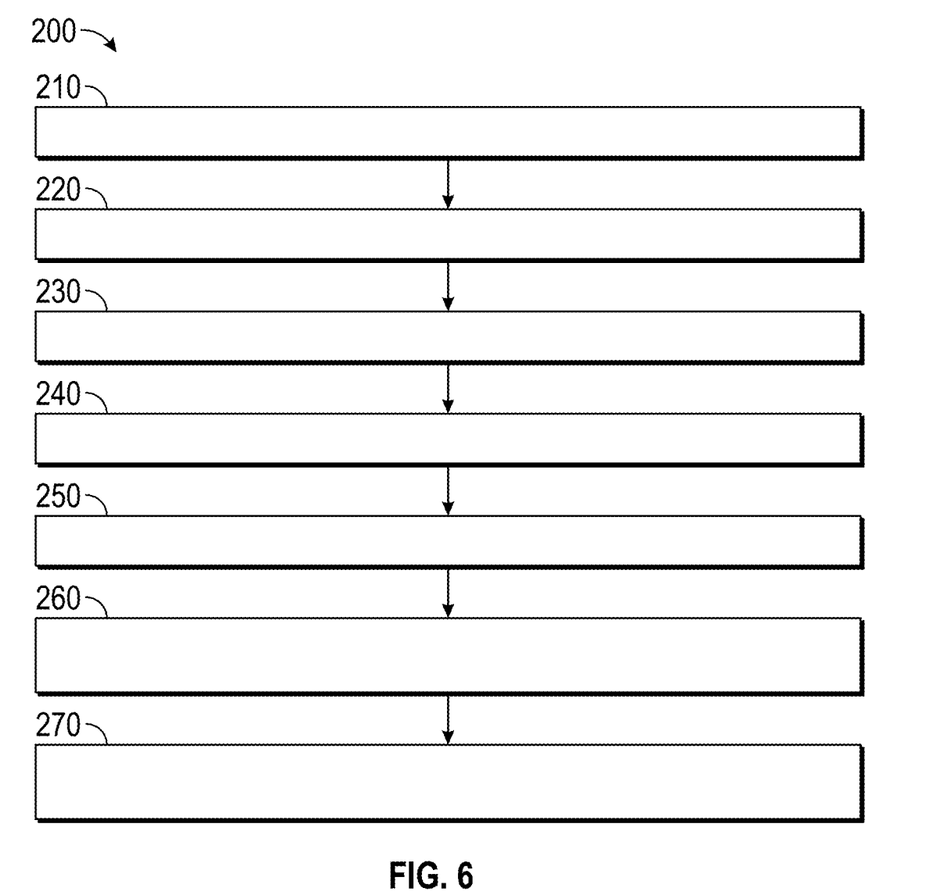
FIG. 6 is a flowchart of a method of training and using a non-blind deblurring module, in accordance with an exemplary embodiment.

FIG. 6 is a flowchart of a method 200 for training and using non-blind deblurring module 34, in accordance with an exemplary embodiment. The method 200 can be implemented in connection with the vehicle 12 of FIG. 1 and the usage and training processing systems 26, 50 of FIGS. 1 and 4, in accordance with an exemplary embodiment.

Method 200 includes step 210 of receiving the blurred input image 24. In usage, the blurred input image 24 is received from the imaging device 14, which may be associated with the vehicle 12 but may also be associated with another device or apparatus. In training, the blurred input image 66 may be artificially generated by the blurred image generation module 58 to incorporate noise data 64 and artificial PSF data 54 into the unblurred test image 60. It is further envisaged that the unblurred test image 60 and the blurred test image 66 are received as part of a stock of blurred and corresponding unblurred images without requiring artificial generation of blurred images.

In step 220, the blurred input image 24, 66 is deconvolved by the regularized deconvolution sub-module 36 applying the deconvolution function 44, thereby providing the deconvolved image 40. The deconvolution function 44 includes the regularization parameter λ, which is not yet optimized during training, but which is optimally selected according to the training methods described herein during usage.

In step 230, the deconvolved image 40 is received by the convolution neural network sub-module 38 and passed through the CNN 42 in order to determine artifacts to be removed. Weights of the CNN 42 are in the process of optimization during training and have been optimized and settled during usage.

In step 240, the deblurred image is output by the non-blind deblurring module 34. The CNN 42 generates residuals 48 that are added to the deconvolved image 40 in order to generate the deblurred output image 20.

Usage step 250 includes controlling a vehicle function, through the vehicle controller 18, based on the deblurred output image 20. Other, non-vehicular, applications are envisaged for the presently disclosed non-blind deblurring technology.

According to step 260, during training, cost function 100 is evaluated by the cost function module 96 based on a difference between the unblurred test image 60 and the deblurred output image 20. In step 270, the training processing system 50 jointly adjusts weights of the CNN 42 and the regularization parameter of the deconvolution function 44 in order to minimize cost (defined by cost data 98)

calculated by the cost function 100. In embodiments, method 200 includes iteratively adjusting the regularization parameter λ in steps in order to minimize costs, wherein each iteration includes multiplying back propagated gradients through each layer of the CNN by the derivative of the deconvolved image 40 with respect to the regularization parameter λ. The back propagated gradients represent the derivative of the cost function with respect to the deconvolved image 40.

Figure 7:
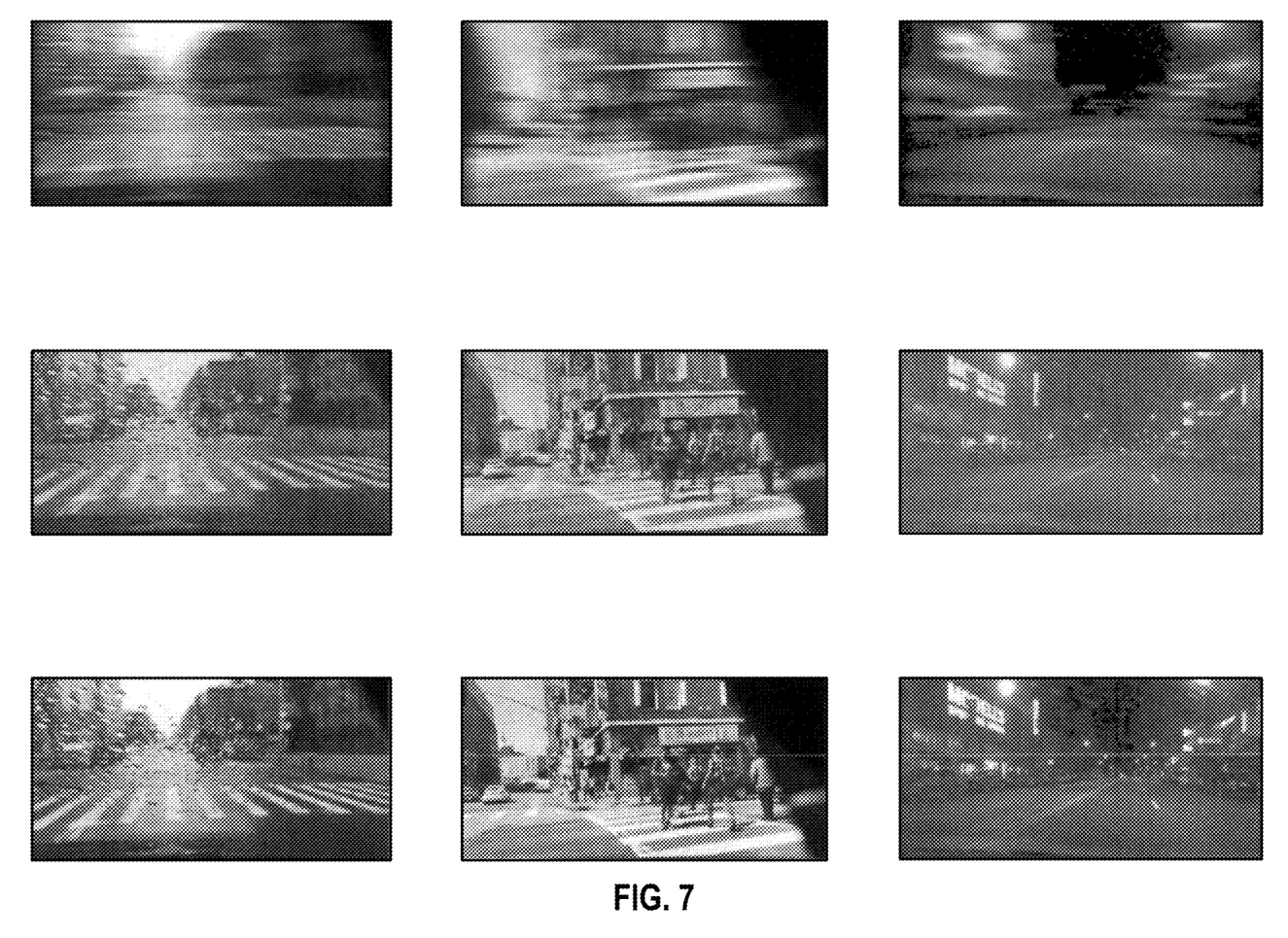
FIG. 7 shows blurred input images, deconvolved images and deblurred output images according to use of the system of FIG. 1, in accordance with an exemplary embodiment.

According to systems and methods described herein, the regularization parameter λ can be trained in order to provide enhanced deblurring of input images in a processing efficient manner. Exemplary results of the non-blind deblurring module 34, having CNN weights and the regularization parameter λ determined according to the joint training scheme described herein, are shown in FIG. 7. Row 1 shows three different blurred input images A1, B1 and C1 having 2D motion blur. These images are operated upon by the deconvolution function 44 (regularized Wiener deconvolution) and its associated trained regularization parameter λ. The resulting deconvolved images A2, B2 and C2 are shown in row 2. These images are sharper and clearer but include some artifacts. Ringing artifacts can particularly be seen in image C2. After passing through the CNN 42, clear, sharp and artifact free deblurred output images A3, B3 and C3 are provided. These output images can be used in further processing steps such as for display on a user interface or in machine vision control functions. Machine vision control functions will be able to better identify features based on the deblurred output images of row 3, which would not have been practical based on the blurred input images of row 1. This is particularly useful in vehicle control systems where safety can be improved as deblurring is improved.

It will be appreciated that the disclosed methods, systems, and vehicles may vary from those depicted in the Figures and described herein. For example, the vehicle 12, the usage and training processing 26, 50 and the system 10 and/or various components thereof may vary from that depicted in FIGS. 1-5 and described in connection therewith. In addition, it will be appreciated that certain steps of the method 200 may vary from those depicted in FIG. 6. It will similarly be appreciated that certain steps of the method described above may occur simultaneously or in a different order than that depicted in FIG. 6.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the appended claims and the legal equivalents thereof

What is claimed is:

1. A method of training a non-blind deblurring module, wherein the non-blind deblurring module includes a regularized deconvolution sub-module and a convolutional neural network sub-module,
the regularized deconvolution sub-module is configured to perform a regularized deconvolution function on a blurred input image to produce a deconvolved image potentially having image artifacts, and
the convolutional neural network sub-module is configured to receive the deconvolved image as an input to a convolutional neural network and to remove image artifacts, thereby providing a deblurred output image,
the method comprising:
receiving, via at least one processor, unblurred test images and blurred test images, wherein each of the blurred test images is related to a corresponding one of the unblurred test images by a blur kernel term and a noise term;
jointly training, via the at least one processor, the regularized deconvolution sub-module and the convolutional neural network by adjusting a regularization parameter of the regularized deconvolution function and weights of the convolution neural network in order to minimize a cost function representative of a difference between each deblurred output image and a corresponding one of the unblurred test images, thereby providing a trained regularization parameter, trained weights and a trained non-blind deblurring module;
receiving, via the at least one processor, a blurred input image from an imaging device;
deblurring, via the at least one processor, the blurred input image using the trained non-blind deblurring module; and
outputting, via the at least one processor, a deblurred output image.

2. The method of claim 1, wherein the deconvolution function is a Wiener deconvolution function.

3. The method of claim 1, wherein the deconvolution function is a Tikhonov-regularized deconvolution function.

4. The method of claim 1, comprising using the trained non-blind deblurring module to deblur the blurred input image, thereby producing the deblurred output image, wherein the regularized deconvolution sub-module performs the regularized deconvolution function on the blurred input image to produce a deconvolved image potentially having image artifacts, the regularized deconvolution function including the trained regularization parameter, and the convolutional neural network sub-module processes the deconvolved image through the convolutional neural network to remove image artifacts, the convolution neural network including the trained weights.

5. The method of claim 4, wherein the convolutional neural network outputs residuals and the trained non-blind deblurring module adds the residuals to the deconvolved image, thereby producing the deblurred output image.

6. The method of claim 1, wherein adjusting, via the at least one processor, the regularization parameter and the weights uses a back propagation algorithm.

7. The method of claim 6, wherein the back propagation algorithm adjusts the regularization parameter based on gradients that have been fed back from the CNN and a derivative of the deconvolved image potentially having image artifacts with respect to the regularization parameter.

8. The method of claim 1, wherein the at least one processor receives the unblurred test images and artificially generates the blurred test images using a blur kernel function and a noise function on the unblurred test images.

9. The method of claim 1, wherein the blurred input image is received from the imaging device mounted to a vehicle.

10. The method of claim 9, wherein the vehicle includes a vehicle controller and the method includes controlling at least one vehicle function based on the deblurred output image.

11. A system for training a non-blind deblurring module, comprising:

a non-blind deblurring module including a regularized deconvolution sub-module and a convolutional neural network sub-module, wherein the regularized deconvolution sub-module is configured to perform a regularized deconvolution function on a blurred input image to produce a deconvolved image potentially having image artifacts, and wherein the convolutional neural network sub-module is configured to receive the deconvolved image as an input to a convolutional neural network and to remove image artifacts, thereby providing a deblurred output image;

an imaging device; and at least one processor configured to execute program instructions, wherein the program instructions are configured to cause the at least one processor to:

received unblurred test images and blurred test images, wherein each of the blurred test images is related to a corresponding one of the unblurred test images by a blur kernel term and a noise term;

jointly train the regularized deconvolution sub-module and the convolutional neural network by adjusting a regularization parameter of the regularized deconvolution function and weights of the convolution neural network in order to minimize a cost function representative of a difference between each deblurred output image and a corresponding one of the unblurred test images, thereby providing a trained regularization parameter, trained weights and a trained non-blind deblurring module;

receive a blurred input image from the imaging device;

deblur the blurred input image using the trained non-blind deblurring module; and output a deblurred output image.

12. The system of claim 11, wherein the deconvolution function is a Wiener deconvolution function.

13. The system of claim 11, wherein the deconvolution function is a Tikhonov-regularized deconvolution function.

14. The system of claim 11, wherein the trained non-blind deblurring module is configured to deblur the blurred input image, thereby producing the deblurred output image, wherein the regularized deconvolution sub-module is configured to perform the regularized deconvolution function on the blurred input image to produce a deconvolved image potentially having image artifacts using the trained regularization parameter, and the convolutional neural network sub-module is configured to process the deconvolved image through the convolutional neural network to remove image artifacts using the trained weights.

15. The system of claim 14, wherein the convolutional neural network is configured to output residuals and the trained non-blind deblurring module is configured to add the residuals to the deconvolved image, thereby producing the deblurred output image.

16. The system of claim 11, wherein the program instructions are configured to cause the at least one processor to adjust the regularization parameter and the weights using a back propagation algorithm.

17. The system of claim 11, wherein the program instructions are configured to cause the at least one processor to adjust the regularization parameter based on gradients that have been fed back from the CNN and a derivative of the deconvolved image potentially having image artifacts with respect to the regularization parameter.

18. The system of claim 11, wherein the program instructions are configured to cause the at least one processor to receive the unblurred test images and artificially generate the blurred test images using a blur kernel function and a noise function on the unblurred test images.

19. The system of claim 11 comprising a vehicle, the vehicle comprising the imaging device and the non-blind deblurring module, the non-blind deblurring module configured to receive the blurred input image from the imaging device.

20. The system of claim 19, wherein the vehicle includes a vehicle controller configured to control at least one vehicle function based on the deblurred output image.

* * * * *